United States Patent [19]

Barker et al.

[11] Patent Number: 4,538,188
[45] Date of Patent: Aug. 27, 1985

[54] VIDEO COMPOSITION METHOD AND APPARATUS

[75] Inventors: Ronald C. Barker, Weston; Chester L. Schuler, Sudbury, both of Mass.

[73] Assignee: Montage Computer Corporation, West Concord, Mass.

[21] Appl. No.: 452,287

[22] Filed: Dec. 22, 1982

[51] Int. Cl.³ .................. H04N 5/782; G11B 27/02
[52] U.S. Cl. ............................. 360/14.3; 360/72.2; 360/33.1
[58] Field of Search .......... 360/14.1, 14.2, 14.3, 360/722, 33.1; 369/30, 32, 83

[56] References Cited

U.S. PATENT DOCUMENTS

| | | | |
|---|---|---|---|
| 2,832,840 | 4/1958 | Morin | 179/100.2 |
| 2,927,154 | 3/1960 | Wolfe et al. | 178/6.6 |
| 3,037,073 | 5/1962 | Roizen et al. | 178/6.6 |
| 3,084,215 | 4/1963 | Bounsall | 178/6.6 |
| 3,123,668 | 3/1964 | Silva | 178/6.8 |
| 3,125,632 | 3/1964 | Sweet | 178/6.8 |
| 3,342,949 | 9/1967 | Wessels | 179/100.2 |
| 3,541,271 | 11/1970 | Joslow et al. | 179/100.2 |
| 3,575,552 | 4/1971 | Grant et al. | 178/6.8 |
| 3,644,683 | 2/1972 | Braun | 179/100.2 B |
| 3,721,757 | 3/1973 | Ettlinger | 178/6.6 A |
| 3,740,463 | 6/1973 | Youngstrom et al. | 178/6.6 A |
| 3,748,381 | 7/1973 | Strobele et al. | 178/6.6 A |
| 3,753,240 | 8/1973 | Merwin | 340/172.5 |
| 3,787,617 | 1/1974 | Fiori | 179/100.2 B |
| 3,824,336 | 7/1974 | Gould et al. | 178/6.8 |
| 3,925,815 | 12/1975 | Lemelson | 360/14 |
| 3,939,490 | 2/1976 | Opelt | 360/14 |
| 4,001,882 | 1/1977 | Fiori et al. | 360/14 |
| 4,040,098 | 8/1977 | Beeson et al. | 360/14 |
| 4,067,049 | 1/1978 | Kelly et al. | 360/14 |
| 4,100,607 | 7/1978 | Skinner | 364/900 |
| 4,115,819 | 7/1978 | Shigeta | 360/14 |
| 4,136,936 | 1/1979 | Roe | 352/129 |
| 4,152,053 | 5/1979 | Menary | 352/130 |
| 4,179,712 | 12/1979 | Opelt | 360/14 |
| 4,195,317 | 3/1980 | Stratton | 360/14 |
| 4,210,785 | 7/1980 | Huber et al. | 179/100.1 |
| 4,210,939 | 7/1980 | Ninomiya et al. | 360/14 |
| 4,210,940 | 7/1980 | Prysby et al. | 360/33 |
| 4,213,163 | 7/1980 | Lemelson | 360/13 |
| 4,214,278 | 7/1980 | Hunt et al. | 360/14 |
| 4,224,644 | 9/1980 | Lewis | 360/72.2 |
| 4,272,790 | 6/1981 | Bates | 360/14 |
| 4,283,745 | 8/1981 | Kuper et al. | 360/13 |
| 4,321,635 | 3/1982 | Tsuyugochi | 360/72.2 |

Primary Examiner—Alan Faber
Attorney, Agent, or Firm—Lahive & Cockfield

[57] ABSTRACT

A video composition apparatus and method select segments from image source material stored on at least one storage media and denote serially connected sequences of the segments to thereby form a composition sequence. The apparatus and method employ pictorial labels associated with each segment for ease of manipulating the segments to form the composition sequence. The labels are displayed on an ordered spatial array of display monitors to simulate the temporal relationship between the segments in what is typically a "snapshot" non-temporal display. The composition control function is highly user interactive and responds to user commands for selectively displaying segments from the source material on a pictorial display. The control function allows the user to denote a start and end of each of a plurality of selected segments to form defined segments, identify each selected segment by a pictorial image segment label which is displayed as described above, and assemble the selected and defined segments, and the corresponding labels, into a serially connected image sequence and a serially connected label sequence corresponding to the image sequence. The composition mode of operation employs continuous looping of the displayed segment(s) to aid in the composing process.

67 Claims, 8 Drawing Figures

AUDIO FOOT CONTROLS

VIDEO COMPOSITION METHOD AND APPARATUS

BACKGROUND OF THE INVENTION

The invention relates generally to an apparatus and method for composing visual source material, and in particular, to an apparatus and method for dynamically composing stored source material for producing either a composition sequence, the electronic data necessary to form the composition sequence, or edited output.

Over the past two decades video tape has substantially replaced the traditional silver halide film and other "non-electronic" film as the preferred media on which to either compose or film a movie or other program material. The increasing use of video tape has occurred despite certain inherent limitations associated with video tape in comparison with traditional film. Video tape, for example, is inherently a "serial access" medium wherein the editor of the medium is unable to "see" the images on the tape medium and must rely instead upon electronic apparatus to produce an edited product. On the contrary, the film editor is able to have "hands-on" access to the visual scenes on the film which he can cut and splice in the editing room.

Thus, the departure from film has dampened in some respects the creative talents of the director in that he is no longer able to apply his talents directly to the program media. Instead, intermediate skilled personnel are employed to control the composing process, taking orders from the director.

The intermediate personnel perform the real-time hands-on manipulation of the video tape in an abstract environment of alphanumerics, in front of a complex control panel. The director's feel for the composition process is diminished, and the composing process is, as a consequence, also very slow and tedious.

It is also known that one advantage to composing film media is the ability to react to the temporal nature of the media. Thus the film can be run back and forth, picked up, and viewed, and physically spliced. These advantages do not yet exist in modern video composing equipment.

Therefore, primary objects of the invention are increasing the throughput in the composing of video source material, lessening or even removing the need for intermediate personnel so that the director is closer and more involved in the composing process, and solving the time-space problem inherent in video tape composition. Other objects of the invention are a flexible composition apparatus and method, and a reliable and "user friendly" apparatus and method that can directly or indirectly be used to automatically create a final edited master.

SUMMARY OF THE INVENTION

The invention relates to a video composition apparatus and method for dynamically selecting segments from image source material and denoting serially connected sequences of segments which will make up the composed production material. The source material is stored in at least one storage medium, in the illustrated embodiment, one or more video tape recorders.

The apparatus of the invention features a pictorial display system, an operator responsive control system, and a composing control system responsive to the operator control system for controlling the storage media and the pictorial display system. The composing control system is typically a microprocessor or computer based system which features hardware and/or software (a) for selectively displaying segments of the image source material on the pictorial display system; (b) for denoting a start and an end of each of a plurality of selected segments of the source material thereby to form defined segments; (c) for identifying each selected segment by a pictorial image segment label; (d) for assembling the selected and defined segments into a serially connected image sequence; (e) for locating, in response to the operator control system, any selected segment by displaying the pictorial labels in a label sequence which corresponds to the image sequence; and (f) for displaying the defined segment identified by a selected label.

The invention, in a particular embodiment, further features a composing control system which is able to selectively operate upon the segments at at least two different levels of composition. The composing control system thereby features elements for grouping serially connected ones of the connected segments into segment groups, the segments in related segment groups having the same connected serial relationship as the segments in the connected image sequence, and the composing system being responsive for identifying each segment group by a pictorial group label. The composing control system thereby is selectively operable for locating any segment group by displaying the pictorial group labels in a group label sequence which corresponds to the segment group sequence.

In order to provide the temporal relationship of the segments in what is inherently a non-temporal spatial representation of image label information, there is further featured in the pictorial display system, a plurality of pictorial display monitors or screens which are arranged in an ordered spatial array. The screens are provided with electrical signals pictorially representing a selected limited number of the sequence of labels and an operator responsive element for changing the displayed labels. Preferably, each of the display screens has associated with it a display processor which is responsive to the composing control system for receiving electrical signals representing an image to be displayed and for repeatedly displaying that received image on an associated pictorial display screen.

While the labels themselves can be any desired available pictorial image, in the illustrated embodiment, the labels representing a segment are chosen from the segment frames and the label is composed of two pictorial frames. The composing apparatus thereby further provides elements for selecting the two pictorial frames, for example, a first label image corresponding to a frame near the beginning of the segment and a second label image corresponding to a frame near the end of the segment.

As noted above, video images can be stored in a serial storage media. Thereby, the apparatus features at least a first and a second serial storage medium, each storing a representation of the segment to be displayed. The apparatus further features elements for selectively controlling image information retrieval from the two storage media for repetitively cycling the first and second storage media for alternate image information retrieval whereby a continuous loop presentation of the segment can be displayed. If desired, and preferably according to the preferred embodiment of the invention, circuitry is provided for inserting an interruption display image between cycles or repetitions of the repeating segment thereby to provide a psychological break for the operator/editor.

The composing apparatus according to another aspect of the invention provides a first segment in a first serial storage memory and a second segment in a second serial storage memory. The composing control system further includes elements for selectively controlling the image information retrieval from the first and second serial memories for repetitively and alternately displaying the first and second segments whereby a continuous loop alternating presentation of the first and second segments is generated. This enables the transition from the first to the second segment to be displayed. The invention can further feature means for dynamically varying the transition between the first and second segments or for providing a separate transition display segment for insertion between the first and second segments. In this mode of operation, it is possible to dynamically change the start and the end of each of the first and second segments during operation of the apparatus.

According to the invention, a plurality, for example up to ten or twelve or more, video tape recorders can be employed for serial storage. Associated with each video tape recorder is a video tape recorder interface, each interface being connected to the composing control system. Thereby, the composing control system operates and controls each of the video tape recorders through its associated interface.

In another aspect of the invention, passive display screens are each adapted to receive, after processing by a video digitizing circuit having an analog-to-digital converter and a read/write digital storage memory, outputs of the video tape recorders which are selected to be displayed on the screens. Preferably, the video screen display is at a much lower resolution than that at which the image is recorded on video tape. A plurality of pictorial display processors, each processor being responsive to the composing control system for receiving electrical signals representing the image to be displayed and for repeatedly displaying the received image on an associated pictorial display screen, receive as their respective inputs, the output of from the video digitizing system. The video digitizing system has elements responsive to the composing control system for converting a video input from a switching system to digital data and for storing that digital data in memory.

The composing apparatus of the invention further has elements for receiving a plurality of video input lines and for directing each of the lines to selected ones of the video tape recorders. In this connection, the apparatus also features a video clock generation circuitry for generating clock signals which include SMPTE time code location signals. The composing control system then includes elements for selectively adding the location signals to the incoming video image data for storage on the video tape recorders.

Importantly, during the operation of the apparatus, there is maintained a record of the sequences of defined segments in accordance with the label selecting and defined elements.

When new incoming video material is available for composing, it may be desirable to automatically divide that material into segments prior to actual composing in order to provide initial labeling identification which will facilitate later composing. The composing control system is therefore further provided with elements for automatically dividing the input source material into segments according to a predetermined selection method. Thereafter, of course, the operator control system can be employed for changing the beginning and ending frames of the segments. The segment presentation displayed on an active display is dynamically updated to visually display the segment with the new beginning and ending locations.

The apparatus further features a printer connected to the composing control system, an alphanumeric input keyboard for inputting, to the composing control system, text material associated with a labeled scene, and wherein the composing control system provides elements for printing a storyboard. The storyboard represents thereon a series of scenes, each scene represented by at least one pictorial label and previously input text material, if any, associated therewith.

The method of the invention features the steps of (a) selectively displaying segments of the image source material on a pictorial display system; (b) denoting a start and an end of each of a plurality of selected segments of the source material thereby to form defined segments; (c) identifying each selected segment by a pictorial image segment label; (d) assembling the selected and defined segments into a serially connected image sequence; (e) locating, in response to an operator control command, any selected segment by displaying the pictorial labels in a label sequence which corresponds to the image sequence; and (f) displaying the defined segment identified by a selected label.

The invention, in a particular embodiment, further features the step of selectively operating upon said segments at at least two different levels. The method thereby features grouping serially connected ones of the connected segments into segment groups, the segments in related segment groups having the same connected serial relationship as the segments in the connected image sequence, identifying each segment group by a pictorial group label, and locating any of the segment groups by displaying the pictorial group labels in a group label sequence which corresponds to the segment group sequence.

In order to provide the temporal relationship of the segments in what is inherently a non-temporal representation of image label information, the method further features providing a plurality of pictorial display screens arranged in an ordered spatial array to simulate the temporal order of the segments, providing the screens with electrical signals pictorially representing a selected limited number of the sequence of labels, and changing the displayed labels. The method also features receiving electrical signals representing an image to be displayed and repeatedly displaying that received image on an associated pictorial display screen.

As noted above, video images can be stored in serial storage media. Thereby, the method features storing a representation of a segment to be displayed in a first and a second serial storage media. The method further features selectively controlling image information retrieval from the two storage media and repetitively cycling the first and second storage media for alternate image information retrieval, whereby a continuous loop presentation of the segment can be displayed. If desired, and preferably according to the preferred embodiment of the invention, the method provides for inserting an interruption display image between cycles or repetitions of the repeating segment thereby to provide a psychological "break" for the operator.

The composing method, according to another aspect of the invention, features the steps of storing a first segment in a first serial storage memory and a second segment in a second serial storage memory, selectively controlling the image information retrieval from the first and second serial memories, and repetitively and alternately displaying the first and second segments whereby a continuous loop alternating presentation of the first and second segments is generated. This enables the transition from the first to the second segment to be displayed. The invention can further feature varying the transition between the first and second segments or providing a separate transition display segment for insertion between the first and second segments. In this mode of operation, it is possible to dynamically change the start and the end of each of the first and second segments during operation of the apparatus.

The composing method of the invention further features, in another aspect, the steps of receiving a plurality of video input lines and directing each of the lines to selected ones of the video tape recorders. In this connection, the method also features generating clock signals which include SMPTE time code location signals, and selectively adding the location signals to incoming video image data for storage on a video tape recorder.

When new incoming information is available for composing, it may be desirable to automatically divide that material into segments prior to actual composing in order to provide initial labeling identification for ease of composing. The method therefore further features automatically dividing the input source material into segments according to a predetermined selection method. Thereafter of course the operator can change the beginning and ending frames of the segments whereby the segment presentation displayed on an active display is thereby dynamically updated to visually represent the new beginning and ending locations.

BRIEF DESCRIPTION OF THE DRAWINGS

Other objects, features, and advantages of the invention will appear from the following description of a preferred embodiment, taken together with the drawings in which.

DESCRIPTION OF A PREFERRED EMBODIMENT

General Description of the Apparatus

The invention is directed to composing image source material, stored in a memory medium, for example, video tape used with a video tape recorder to produce an assembly of segments making up a program or story. In some applications, composition can, but need not, further include the editing function of creating a final edited master. Typically, the image source either is derived from already existing, production quality video tape(s) or is provided, in real time, from one or more video cameras for recording on video tape.

In its standard format, the video signal has a plurality of frames, each frame having two fields. When the video tape is prepared, the recording device associates with each field a specific address or identification tag. The address is typically provided in accordance with the SMPTE time code, a standard used throughout the television industry. Thus, irrespective of the source of the video material, there is associated with each field of the recorded signal, a unique address or location which is read when the field is read or otherwise retrieved.

Figure 1:
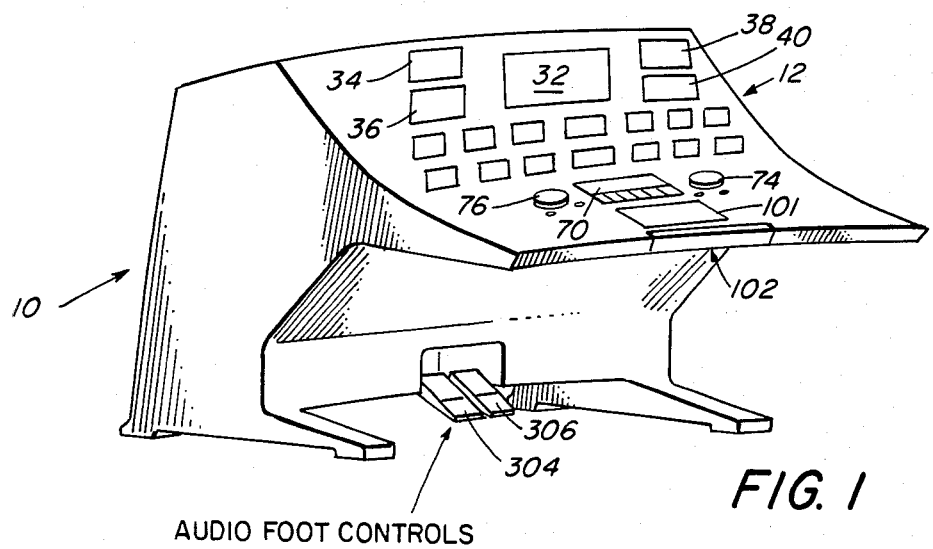
FIG. 1 is a perspective view of the operating apparatus according to the invention.

Referring to FIG. 1, a video composition system 10 has a control console 12 from which an operator/editor controls the entire operation of the system and provides the composing instructions which enable the system to prepare a listing of video segments to be serially connected to form a finished composition sequence. As used herein segment refers to a sequence of frames. The frame sequence may form a shot, a scene (a sequence of shots), a picture sector (a sequence of scenes), or a program or story (a sequence of picture sectors).

Figure 3:
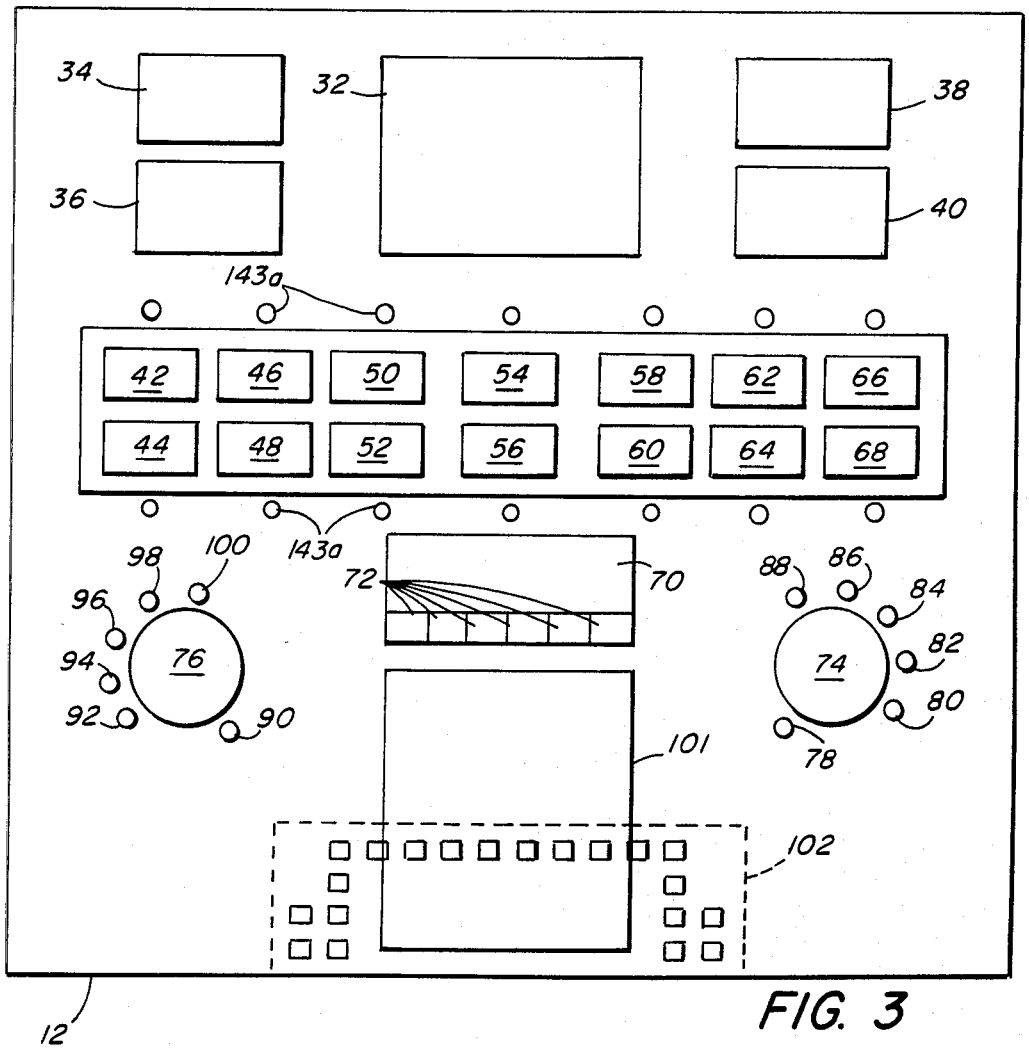
FIG. 3 is a detailed plan view of a typical console according to the invention.

According to the illustrated embodiment of the invention, and referring to FIG. 3, the system employs a plurality of serial storage media. The storage media need not be limited to serial storage; however, present technology has not provided random access storage medium of sufficient capacity to replace the serial storage medium. In the illustrated embodiment, the serial storage media are video tape recorders (VTR's) such as those commercially sold and manufactured by Sony Corporation under model No. 2500. This VTR operates according to the beta format, has multiple heads for both simultaneous recording and retrieval, provides a times-two and times-five speed control, a frame freeze for both forward and reverse modes, and allows significant remote control capability. The illustrated VTR's, labeled 14, 16, 18, and 20, in FIG. 3, interface with a computer/controller 22 through respective recorder interfaces 24, 26, 28, and 30. While only four VTR's are drawn in the Figures, it is contemplated that the system 10 includes up to twelve or more VTR's to accomplish the many functions and provide the many features to be described hereinafter. For purposes of simplicity in the drawing, more VTR's have not been shown but have been indicated by the plurality of dots between the various recorders 14, 16 and 16, 18.

The control of the entire system depends upon the man-machine interaction available from the control console 12. Referring to FIG. 3, the control console has a large main display screen 32 flanked by a plurality of smaller display screens 34, 36, 28, and 40. There are further provided a plurality of yet smaller label display screens 42, 44, 46, . . . ,68 arranged in a two row ordered array. Below the label display screens is an alphanumeric information display screen 70. A plurality of menu control buttons 72 appear below and adjacent to screen 70, and a right hand control disk 74 and a left hand control disk 76 appear on the right and left sides respectively of the screen 70. Adjacent the control disks are a number of control buttons 78, 80, 82, ..., 100, whose functions are described in greater detail below. Space below buttons 72 is available for a storyboard 101 which is useful to the user as an aid and guide.

Positioned normally out of sight, and below the control console upper panel surface, is a keyboard unit 102 having a full typewriter keyboard for entering alphanumeric information into the computer/controller 22 and for responding to requests for information or instructions which appear on the display screen 70. In the illustrated embodiment of the invention, the typewriter keyboard is mounted on tracks to slide out of sight below the upper panel surface of the control console. The preferred and described layout of the control console 12 can be changed in accordance the needs of the particular application. Thus, other applications can require a different arrangement of the components and/or different numbers of display screens or other controls.

As noted above, the apparatus is heavily user interactive. From the control panel the user/editor can effect substantially any operating mode which is typically required for producing a production video tape from one or more available video tapes. The scenes recorded on video tape are made up of a sequence of frames, each frame being composed of two television fields. As noted above, the frames, when sequentially connected together form in the most elementary sense "shots". A plurality of shots can be grouped together to form a scene and a plurality of scenes can be grouped together for forming the video sector. Correspondingly, a plurality of video sectors together form an entire production or story. The apparatus herein is designed to operate at any of the levels of the shot, scene, or sector. Thus depending upon the level of operation selected, the apparatus can operate either at the shot level, the scene level, or the sector level. This becomes important when flexibility and ease of operation of the apparatus is considered.

A major feature of the invention is the use of pictorial labels to designate a sequence of frames, hereinafter generally referred to as a segment, of the video image being edited. Thus, instead of forcing the user to identify a video segment by either the SMPTE time code or another artificial determination, one or more fields or frames of the segment are employed to pictorially "label" the segment. The labels may be selected, as described below, from frames at or near the the beginning of the segment, at or near the end of the segment, or somewhere in between. Furthermore, more than one label can be used for a segment, and in the illustrated embodiment of the invention, two labels are used, one pictorial label corresponding to a frame near the beginning of the segment and a second pictorial label corresponding to a frame near the end of the segment. (Alternately, one label can be employed during an initial "rough cut" and two labels can then be used for the later composition work.) As the segments are assembled, in a desired order, as described hereinafter, the labels corresponding to the segments are similarly ordered.

In the illustrated embodiment of the invention the display screens 42, 44, 46, ..., 68 are designated "passive displays" and are employed for presenting a spatial display of the labels associated with the segments sequentially before and after a current segment being viewed on the main screen or "active display" 32. The labels associated with the current segment being viewed will typically be displayed in the center of the passive displays, for example on screens 54 and 56. Pictorial labels corresponding to the three earlier segments will be displayed in the three earlier display screen pairs, i.e., display pairs 58, 60; 62, 64; and 66, 68, while pictorial labels corresponding to later occurring segments, if known, will be presented in passive display screens 42, 44; 46, 48; and 50, 52. Thus, the control console provides a spatial display corresponding to the temporal image presentation. This "snapshot" label display enables the user to maintain in temporal perspective where the presently displayed segment fits in the segment sequence.

Figure 2:
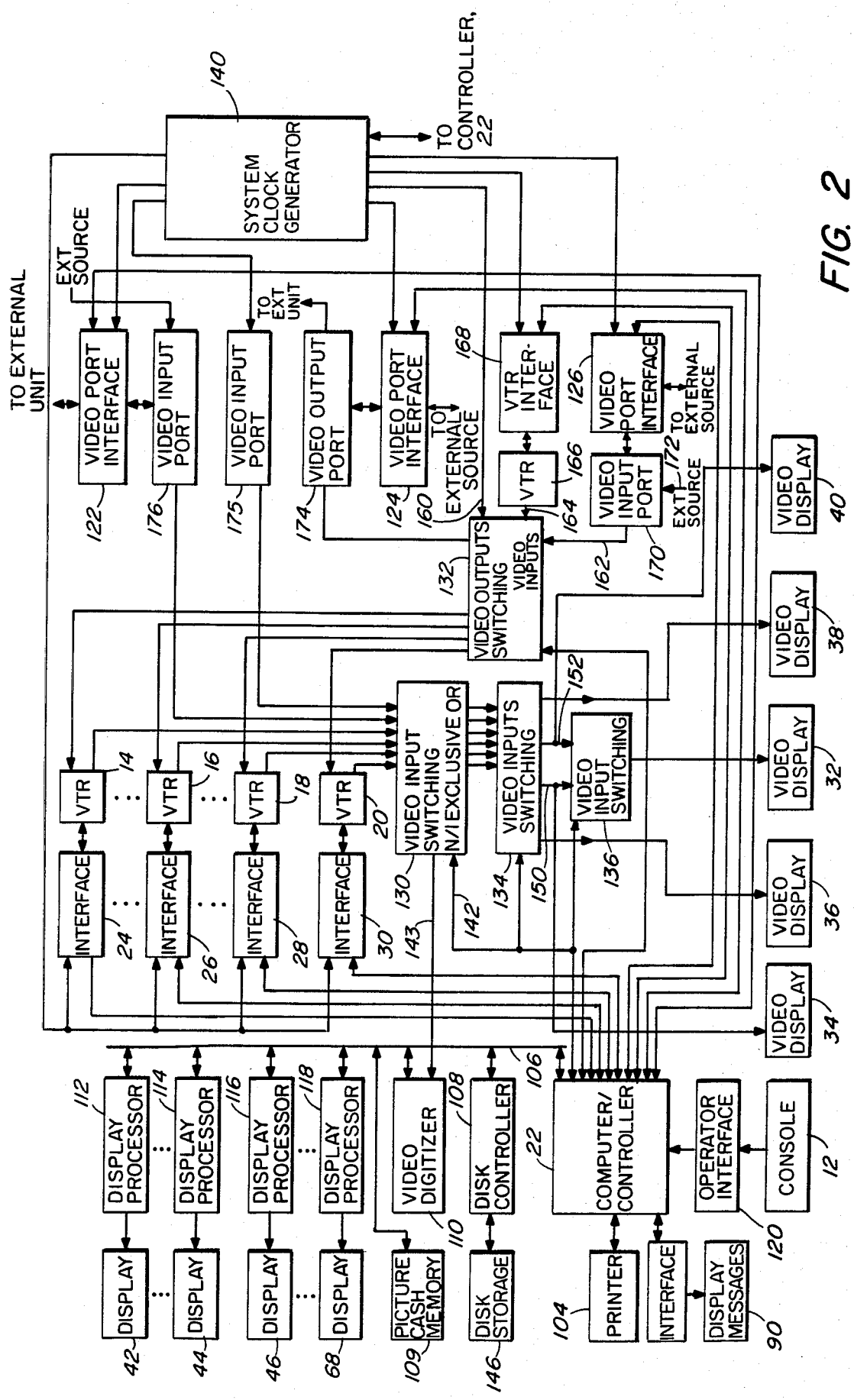
FIG. 2 is a detailed schematic block diagram of the electrical circuitry according to the invention.

Referring to FIG. 2, the communications and data management center of the apparatus is the composing computer/controller 22. The computer/controller has a central processing unit which may be for example an Omnibyte OB68K1A. Associated with the controller 22 is a printer 104, for example a dot matrix printer such as the Versatec V80. The controller 22 further has a digital data bus 106 for transmitting digital data between the computer, a disk controller 108, a picture cash memory 109, a video digitizer 110, and a plurality of display processing interfaces 112, 114, 116, and 118. The controller 22 is further adapted to receive inputs from the control console 12 through an interface unit 120. Further, as noted above, the controller 22 is in direct communication with the various VTR interfaces 24, 26, 28, and 30 as well as the video port interfaces 122, 124, and 126. (Interfaces 122, 124 and 126 operate in response to controller 22 for controlling external video equipment, for example VTR's.) The controller 22 also operates video input and output switching circuitry 130, 132, 134, and 136. Also, in the illustrated embodiment, controller 22 operates to synchronize with a system clock generator 140.

In the illustrated embodiment, controller 22 operates, if desired, at the beginning of a composing session, to divide "raw video" source material into plural segments. The apparatus is designed to effect, under operator control, a segmentation of the source material according to a predetermined method and sequence. On the other hand, it may be more desirable for the operator to review the source material quickly and "roughly" indicating his initial feel for the divisions between shots, scenes, and/or sectors.

Controller 22 is further responsive to the operator console for providing a storyboard output to printer 104. The storyboard output includes a sequence of labels, generally at the sector level or scene level, which describe the flow of the story. In addition, if textual material had been entered from the keyboard of console 12 with respect to any segment label, that material is also printed on the storyboard. The operator/editor can then use the storyboard as a "hard copy" guide and aid during the composition process.

Passive Display Operation

Figure 4:
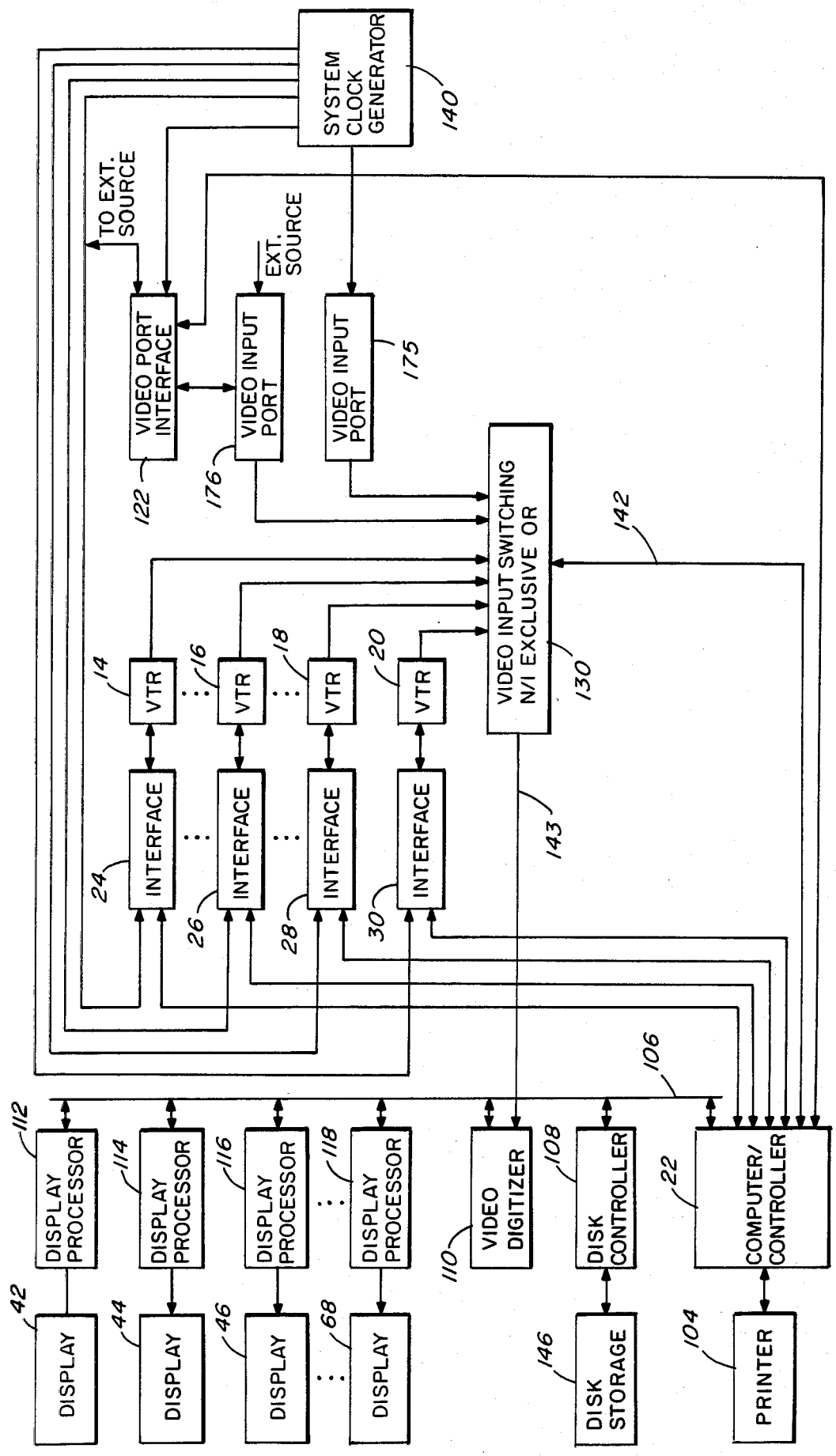
FIG. 4 is a partial electrical schematic corresponding to FIG. 2 and showing those elements necessary for display generation and control for the passive display screens.

Referring to FIG. 4, in accordance with the illustrated embodiment of the invention, each passive display screen 42, 44, 46, ..., 68 is a 3.7 inch monitor on which a relatively low resolution 128×120 picture element (pixel) raster is displayed. In the preferred embodiment of the invention, the raster has sixteen levels of gray scale corresponding to four bits of information. In other embodiments of the invention, greater or less resolution both spatially and in gray scale can be employed.

Each display screen in the illustrated embodiment has associated with it a display processor. Each display processor has a memory unit such as an eight kilobyte RAM operating with the necessary interface circuitry to receive picture element data from the digital bus 106 and display it, repetitively, in the low resolution display on the display screen.

The digital display data, which represents the pictorial labels, is generated by the video digitizer 110 under control of the controller 22. Digitizer 110 receives analog video input data from the video input switching circuitry 130. The video digitizer which includes a fast A-D converter and a large capacity random access memory stores the digitized video, digitized to four bits, for later presentation over the digital bus either to a selected display processor or to the disk storage. Controller 22 controls the flow of digital data from the video digitizer or disk storage to the various display processors and is capable of dynamically updating the pictorial labels displayed at the console 12 in a short time, for example, less than one second.

The digitizer has a computer interface which receives instructions from controller 22 over the computer bus. The digitizer is fast enough to "grab" a frame "on-the-fly" from an ongoing stream of video information. The interface can therefore be instructed to "trigger" the controller 22 upon recognition of a specific time code, and the video associated therewith will then be digitized and stored. The frame time code is used to label the frame. The digitizer can also digitize a frame displayed in the "freeze" mode of VTR operation and read its time code for storage and future use as a reference for the controller.

The video output of video input switching circuitry 130 to the video digitizer is "dictated" by the signal levels from the controller 22 over lines 142. The video input switching circuitry 130 has two components. The first component is an N/1 EXCLUSIVE OR circuitry which takes one of the video inputs (from the VTR's 14, ..., 16, ..., 18, 20 and video input ports 175, 176) and provides it to the video digitizer over a line 143. The selected video input signal becomes a pictorial label and the selection process is controlled by the operator/editor sitting before control console 12.

As noted above, controller 22 has associated with its disk controller 108 a high speed disk storage device 146. Storage device 146 can be employed, for example, to store all labels of interest so that they can be output to the display interfaces as needed. Since the passive display requires only eight kilobytes of information, the disk controller and disk storage are fully capable of changing all of the displays within a short time period and therefore provide a great flexibility to operation of the pictorial label feature of the apparatus.

Even though the disk controller and disk storage can operate with access speeds on the order of ten milliseconds, the retrieval of labels from different sections of the disk can result in a non-uniform rate of change for the passive displays. The apparatus therefore employs the picture cash memory 109, a high speed solid state memory attached to the controller bus 106, for maintaining a fast uniform label change rate. The cash memory typically has sufficient memory for sixty label pairs and an access time on the order of tens of microseconds. The memory operates under the control of controller 22 and receives new label pairs, as needed, from the disk 146 under control of controller 22.

In accordance with an especially preferred embodiment of the invention, textual display material, associated with a label and its corresponding segment, is added to the display data stored in the display processors 112, 114, 116, 118. The text is then made available for viewing on the passive display screens as follows. The display monitor screens are rectangular, and since the array storage is generally square (that is, for example, 128×128 elements), there becomes available a small strip of the display storage corresponding to a horizontal edge strip. The horizontal strip, which can be at the bottom of the screen, does not normally appear visible to the user.

The controller 22 operates to insert into the displayed image the available textual material. This material is inserted below the pictorial label, and correspondingly, a switch 143a is provided in association with each label screen to move the display in a vertical direction. Thus, in one position of the switch a portion of the pictorial label is cut off (at the top of the screen) and a text message is available at the bottom of the screen. In the other position of the switch, the full pictorial label is displayed while the message is cut off. While other forms of display could be employed, for example an overlay of textual material on the display monitor, in the illustrated and preferred embodiment of the invention the shifting mechanism described above is preferred.

Video Display Processing - The Active Displays

Figure 5:
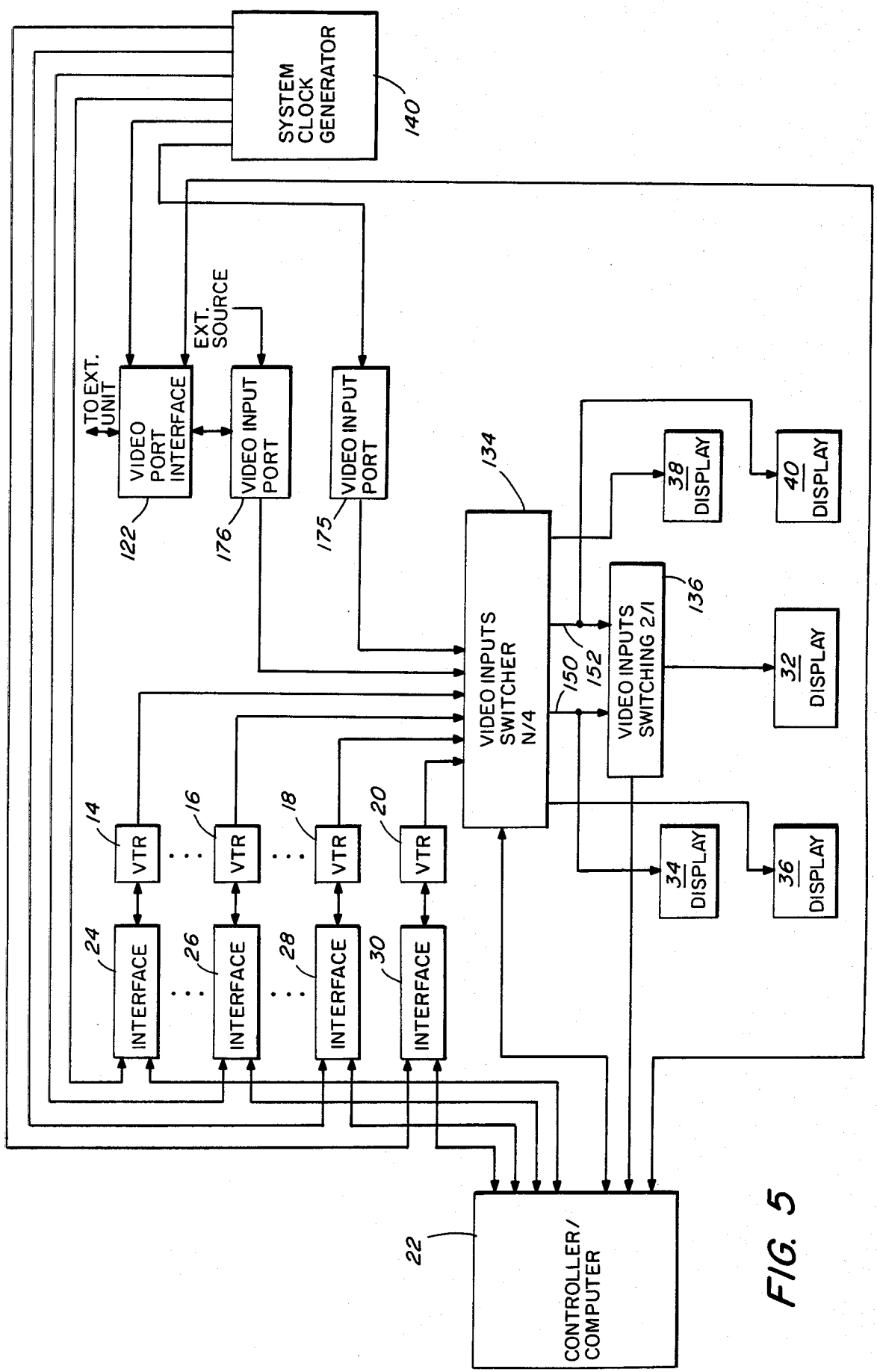
FIG. 5 is a partial electrical schematic corresponding to FIG. 2 and showing the elements necessary for displaying and controlling video on the active display screens.

Referring to FIG. 5, there are provided on console 12 the active main display screen 32 and four subsidiary active display screens 34, 36, 38, and 40. The active display screen 32 is preferably a color monitor. In the illustrated embodiment, these monitors receive analog video signals from video switching circuits 134 and 136. These circuits, operating under the control of controller 22, select real time video signal outputs from among the video tape recorders and video input ports for display on the various active display screens. In other embodiments, for those active displays which require the display of, for example, a single frame such as a pictorial label, the passive display implementation can be employed. Thus, rather than using analog video from a VTR operating in a freeze frame mode, a digital raster generated by video digitizer 110 can be satisfactorily employed.

In the illustrated embodiment, under the direction of the controller 22, four of the video inputs are selected for display on the five available monitors. Monitors 34, 36, 38, and 40 each connect to a different video output available from video switching circuitry 134. The main color monitor 32 provides a video output from switching element 136 which, under the control of controller 22, selects one or the other of the video input signals 150, 152 to be the output video signal. In this manner, the monitor 32 can be employed for displaying for example a continuous loop presentation of a video segment (as discussed further below) or a continuous loop presentation of the transition between two video segments. The switching circuitry 134 and 136 can be employed to, for example, blank all monitors except the main color monitor and to display on it the output of a single video input to circuitry 134.

In the illustrated embodiment of the invention, video switches 134 and 136 are commercially available devices specifically designed to provide the necessary video switch function. Effectively, they provide an EXCLUSIVE OR function choosing from among the various input signals for display of the output signal.

For example, element 134 can be composed of four N/1 video switches (similar to video input switch circuit 130) with one of the switch elements being dedicated to each of the video outputs. All of the elements would receive the same video inputs.

VIDEO INPUT/OUTPUT RECORDING

Figure 6:
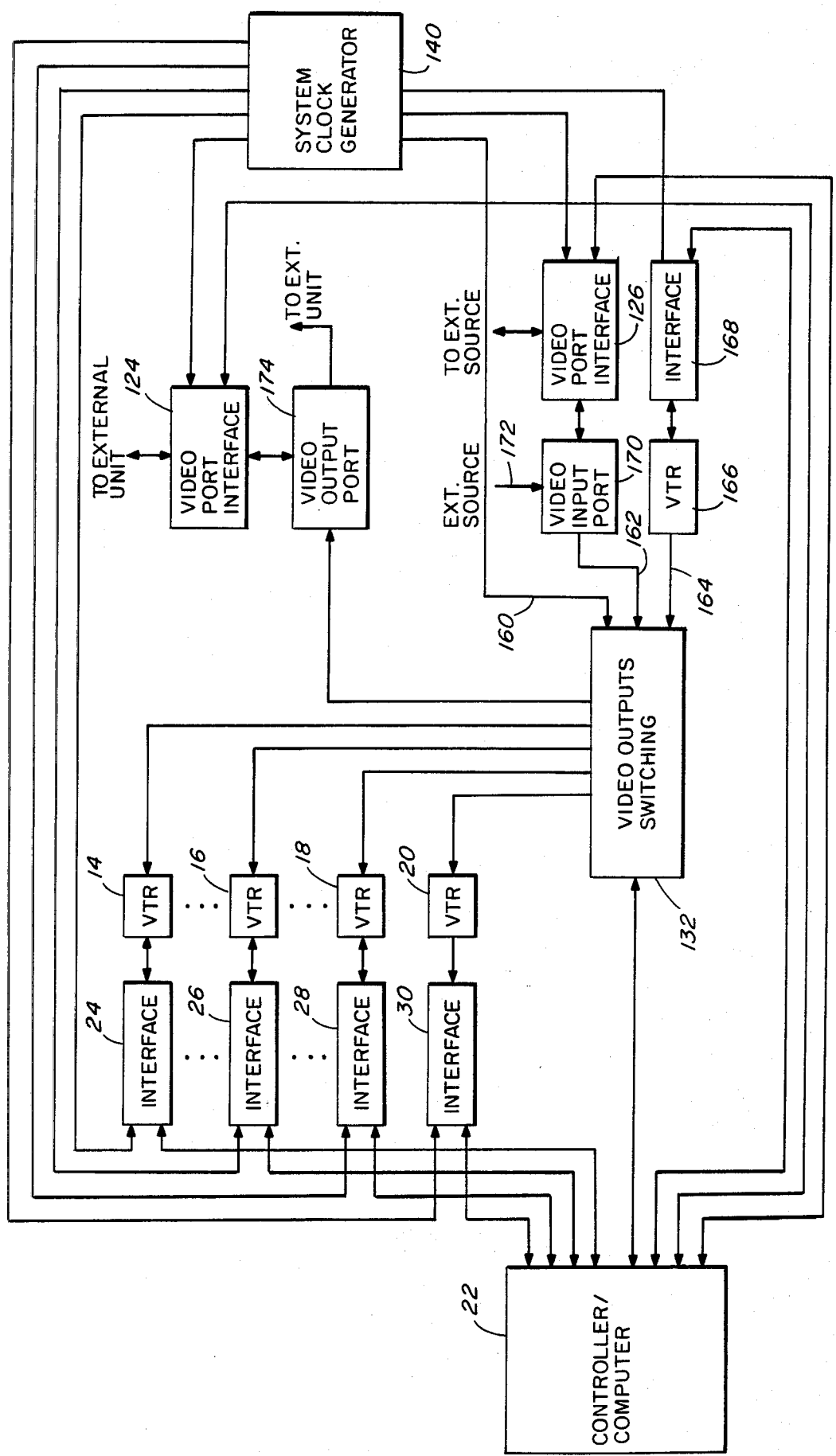
FIG. 6 is a partial electrical schematic corresponding to FIG. 2 and showing those portions of the system necessary for inputting video to the apparatus.

Referring now to FIG. 6, the video input switching circuitry 132, under control of controller 22, directs one or more of the video input signals over lines 160, 162, and 164 to one of the receivers of video such as a video tape recorder or a video output port (the latter for delivery to, for example, a video recorder not associated with the present embodiment of the invention). The "fresh" video input may be from a video tape recorder 166, which has associated with it a video interface 168, a video input port 170, or the system clock generator. Video interface 168 receives clock information, as described in detail below, from the system clock generator 140 and control signal information from the controller 22. Video input port 170 receives video over a line 172 and operates under control of the video port interface 126. The video input port 170 can receive a video signal over line 172 from for example a video camera. This video information can be combined with clock identification signals from the system clock generator 140 over line 162 over separate line 160. The system clock generator 140 provides SMPTE time code signals for use in the composing process.

The video output switching circuitry 132 connects combinations of the video signals over lines 160, 162, and 164 to a video output port 174, controlled by the video port interface 124, or to a video tape recorder for recording. If necessary, the time code location over lines 160 from the clock generator 140 is available for writing onto the video tape recorders. This occurs if the video signals do not already contain the time code information.

The video switches comprising circuitry 132 are commercially available devices and operate as an EXCLUSIVE OR gate with respect to the video output and an INCLUSIVE OR gate with respect to the video inputs. Thus, any combination of video inputs can be combined and placed on any one of the output lines. The entire operation of the switching circuit 132 is under the control of the controller 22. The circuitry therefore in effect places the video input signal, including time code information if necessary, on the line wherein it is required.

Video Tape Recorder Interface Operation

Figure 7:
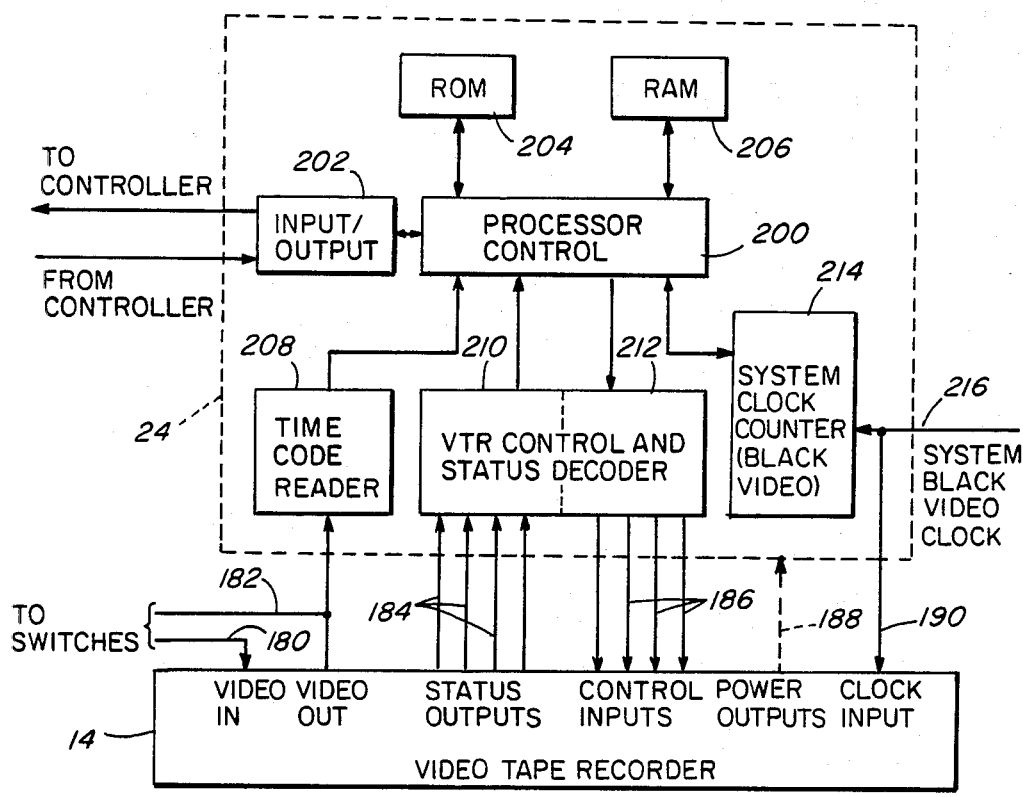
FIG. 7 is a detailed block diagram of the video tape recorder interface.

As noted, there is associated with each of the commercially available video tape recorders, a video tape recorder interface. This is, in essence, a smart terminal. Referring now to FIG. 7, a typical video tape recorder, for example recorder 14, and its associated interface 24 are shown in greater detail. Each video tape recorder has a video input line 180, a video output line 182, a plurality of status output lines 184, a plurality of controlling input lines 186, a power output line 188, and a clocked input line 190. According to the illustrated embodiment of the invention, the commercially available video tape recorder has circuitry for enabling the output of the video tape recorder to be RF modulated for display on a standard television screen channel. This is not necessary according to the preferred embodiment of the invention wherein the video displays need not be provided with the RF modulator output required for typical television. Therefore, according to the preferred embodiment of the invention, the RF output section of the video tape recorder is removed and in its place is mounted the interface "card" described below. Furthermore, power for the card is then available in the embodiment from the video tape recorder over lines 188.

According to the illustrated embodiment, the VTR interface 24, which is identical for all of the video tape recorders employed in the illustrated embodiment, has a microprocessor control element 200 which receives digital instructions from controller 22 through an input/output network 202. This provides a distributed processing structure and allows the controller 22 to act more as a remote manager over what could be multiple simultaneously occurring operations. Associated with the microprocessor are both read only memory 204 and random access memory 206. According to the illustrated embodiment of the invention, processor 200 is a Z8080 device manufactured by Intel. The processor 200 receives status data input from the video tape recorder through a time code reader 208 and a VTR status decoder 210. VTR status decoder 210 further includes a VTR control circuitry 212 which enables the microprocessor 200 to control the operation of the video tape recorder. The microprocessor 200 also has access to the system clock through a system clock counter 214. The system clock counter receives an input from the system clock generator 140 over a line 216.

In operation, the microprocessor control 200 receives operating instructions from the controller 22. The operating instructions include for example a tape start location, a tape start time, and an ending location for the video tape recorder. The microprocessor control is then capable of positioning the video tape recorder in accordance with the operating instructions. The location of the video tape is indicated by the output of the time code reader which uniquely identifies each frame on the tape. Operation of the video tape recorder can then take place in accordance with the system clock available through clock counter 214. When required, data can be written onto tape, including the clock input providing the time code information, under control of the microprocessor 200. Operation of the video tape recorder is in a standard manner as is well known to those skilled in the art.

General Operation of the Apparatus

In operation, the composing apparatus is controlled solely from the control console and in particular by the control disks 74, 76, and control buttons 78, 80, ..., 100, in association with buttons 72 below screen 70. The two control disks 74, 76 are hand controls which allow the manipulation and selection of earlier or later pictorial labels by counterclockwise (earlier) and clockwise (later) movement respectively. These disks also change the beginning and end of a segment or a transition between segments. The disks 74, 76 in the illustrated embodiment are active during the composition and transition mode. They may be, for example, wheels, 3 inches in diameter and three-quarters of an inch high and preferably have a finger sized indentation on their upper surface. The wheels have multiple detent positions in each revolution, one detent relating to one frame of trim in the shot mode or one shot or scene in the scene or sector operating modes. Thus, in either the composition or transition mode, each disk is used to position the pictorial labels in the display screens both spatially and temporally.

The control disks 74 and 76 each have two vertical positions and a momentary lowermost depressed position. In the composition mode, in the lower vertical position, the left hand control disk controls the left hand (the intake) screen 36 and the right hand control wheel controls the right hand (outtake) screen 38. In each case, counterclockwise movement causes contiguous frames prior to the respective label to be displayed as a "temporary" pictorial label while clockwise movement causes contiguous frames subsequent to the respective label to be similarly displayed. Each wheel detent corresponds to one picture frame. The central display 32 provides a continuous loop display of all the picture frames from just prior to the temporary intake, to just subsequent to the temporary outtake, pictorial labels. Both wheels can be momentarily depressed vertically to mark the respective temporary pictorial labels for acceptance. When the beginning and ending pictorial labels have been so marked, they are automatically positioned in the spatial array of passive display screens, that is, in the label sequence. When both have been marked for acceptance, the subsequent pictorial labels automatically sequence for display on screens 36 and 38 and the corresponding segment is displayed in a continuous loop on screen 32.

The upper vertical position of the right hand control disk 76 controls the incremental position of the contiguous pictorial labels displayed on the passive display screens. Counterclockwise movement of the disk increments the pictorial labels to the left. As the labels increment to the left, the central spatial position, corresponding to screens 54 and 56 in the illustrated embodiment, represents a subsequent picture label. Clockwise movement of the disk increments the picture labels to the right wherein the central display screens will next represent prior pictorial labels. One wheel detent represents one increment of movement for one pair of vertically related pictorial labels in the illustrated embodiment. The buttons surrounding the right hand wheel, which, as noted below, are the composition mode related buttons, act on whichever pictorial labels are presented on the passive display screens 54, 56, that is, on the segment to which they relate.

The upper vertical position of the left hand control disk controls the temporal speed of the central looping display on screen 32. Counterclockwise movement slows the display while clockwise movement provides for a faster display. One full revolution of the disk varies the speed from "still" to "double" without further change for additional movement. When the disk is returned to its lower vertical position the last speed selected becomes the "default" speed for the looping display.

Thus, in the illustrated embodiment the left control disk relates to the pictorial label at or near the beginning of the segment while the other, the right disk 76 relates to the label at or near the end of the segment. For convenience, the pictorial labels used herein as noted above, are the first and last frames respectively of a segment. Thus, the hand control disks change the duration (either shorter or longer) of the displayed segment and do so either at the beginning or end of the segment (or both). The pictorial labels associated with the segment are thus automatically updated and displayed on screens 36 and 38. In addition controller 22 maintains an automatically updated listing of the sequence of label locations.

If two segments are being displayed in connected sequence (transition mode), the two segments are recorded on separate video tape recorders and screens 34 and 40 display the output of the respective video tape recorders as the screen 32 displays the continuous loop. Screens 36 and 38 display the end label of the first segment (the first label of the transition label pair) and the beginning label of the second segment (the second label of the transition label pair), respectively. Thus, for example, screen 34 can display the intake shot as it is being displayed on screen 32 and even after the transition, while screen 40 can display the outtake segment both before and after the transition. In the transition mode, as in the composition mode, an interruption display, for a "psychological break" is advantageous and is provided before the first segment of the transition is rerun.

Some transitions, such as an overlapping fade out-fade in, will require overlap of two successive segments. In this case, according to the illustrated embodiment, the first label of the transition label pair is the frame of the first segment at which transition fade-out begins (the beginning of transition), and the second label of the transition label pair is the frame of the second segment at which fade-in is complete (the end of transition). The control disks 74, 76 control the shifting and marking of the transition labels in the same manner as they do for manipulating the composition labels.

Figure 8:
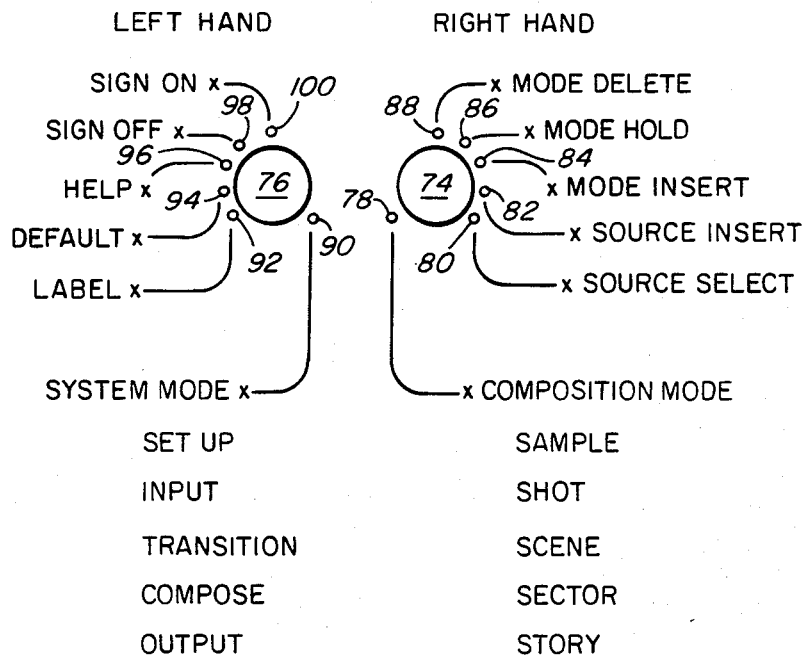
FIG. 8 is a schematic diagram of the operator control elements including the control knob and push-buttons for interactive operation and control of the apparatus.

Referring to the buttons associated with the control knobs, their functions are illustrated in FIG. 8. In accordance with FIG. 8, right hand button 78 is employed to select the level of operation in the composition mode. The button can be repeatedly depressed to increment through the five composition levels which determine the functional operation level of each composition finger button (buttons 80, 82, 84, 86, 88). Thus, the apparatus can operate, according to the invention, at one of five levels. In the sample mode, a single frame is displayed. In the shot mode, a plurality of frames, grouped together to form a shot, are manipulated. The scene mode calls for manipulation of the shots; the sector mode, manipulation of scenes; and the story mode, the manipulation of sectors.

Button 80 is employed to select the source of video information. This button scrolls through system, external live, and internal taped source input ports. Whenever the control disks 74 and 76 are moved subsequent to a source select operation, the selected source will automatically revert to system black video which can be inserted at any time and location using a source insert button 82. Whenever a source other than system black video is selected, the source label appears as a display overlay on the operative pictorial label display screen.

Button 82 represents a latch down and latch up arrangement for inserting any external source material into the system during a composition mode and at the operative pictorial label location selected. All other system controls are locked out while the source insert is latched down. Any source material inserted in this manner will be controlled by and usable in the same manner as the original input default menu which has been employed.

Button 84 relates to a "mode insert", which has an automatic repeat function. This insert button places any pictorial labels (and the associated segments) which have been "held", in the "hold mode" immediately prior to the current pictorial label, and related segment, being displayed. The pictorial labels which are inserted remain available for additional insertion (this is the automatic repeat function) in the same location or at any other location in the composition sequence.

Button 86 relates to a "hold mode" wherein the operative pictorial label, and hence the related segment, is deleted from the composition sequence. The pictorial label thus held remains available for insertion in the "insert mode", until such time as the hold mode button is again requested in which case the earlier requested pictorial label will be deleted.

Button 88 is directed to a "delete mode" wherein the pictorial label and hence the related segment being reviewed will be deleted from the composition sequence. It can thus be appreciated that by manipulation the pictorial labels, the segments associated therewith are also automatically manipulated.

Referring to the left hand buttons, the system parameter buttons, button 90 increments the system through the five system modes, each of which is controlled by a prompting menu on the screen 70. In response to the prompting menu, one of buttons 72 can be employed to direct the system to the appropriate mode or, on the other hand, typewriter keyboard input with special operator requests can be implemented. This function is used in conjunction with each of the system parameter finger buttons, the buttons labeled 92, 94, 96, 98, and 100. The system modes of operation are set up, input, transition, compose, and output.

Button 92 is employed to add typewriter keyboard entered notes in the composition mode of operation. Those notes are then permanently carried with the then current pictorial labels.

The default button 94 provides a system default summary menu on screen 70 which is set during sign on. It further allows any other operator selected button, when used in conjunction with the default button, to update a default parameter.

When assistance is needed, the help button 96 responds with a menu on screen 70 which the operator can direct using buttons 72. The help button is a two way toggle that provides automatic escape from any other mode and reentry back into that mode. The operator may thus escape from the mode being used, prior to requesting help with the menus provided by activation of the help button 96.

The sign off button 98 selects an operator sign off menu from which prompting parameters are selected using buttons 72. The operator may select statistical session data for printout and/or leave specific typewriter entered comments for other operators who wish to continue the same editorial composition. The operator may also specifically inhibit the use of his composition material by others thereby providing the operator with security from tampering.

Button 100 is a sign on button which selects an operator sign on menu from which prompting parameters are selected using buttons 72. The operator can enter alphanumerics from keyboard 102. The operator may further force a release from the sign on mode by requesting help using button 96.

In a typical operation of the illustrated embodiment for repeatedly displaying a single segment, the apparatus operates as follows. The video tape recorders which contain identical copies of the segment are initially positioned to a location in advance of the segment. Data, provided by the controller 22 to each video tape recorder associated interface, indicates both a start time and a start position, as well as an ending position for each recorder. At the earliest start time, which is referenced to the system clock generator 140, one of the video tape recorders begins to provide video signals to the switching circuitries 130, 134, and 136. The video is directed by controller 22 to the main display 32. At a time prior to the end of the segment display, the second video tape recorder begins operation in accordance with instructions received from the controller 22. At the end of the segment display provided by the first tape recorder the video switching circuitry switches from the first tape recorder to the second tape recorder, the timing being such that the second tape recorder just begins the segment to be displayed at the transfer time. Video switching circuitry 136 thus switches at the end of the segment on the first tape recorder to display the beginning of the segment coming from the second tape recorder. At the same time, the first tape recorder stops and rewinds to the beginning of the segment so that at the end of the segment on the second tape recorder, the first tape recorder will be ready to display the segment again. This provides a continuous non-interrupted loop of the same video segment. In addition to the display on screen 32, screens 36 and 38 are provided, through switching circuitry 130 and 134 with the pictorial labels associated with the then current segment. These labels are provided by yet other video tape recorders operating in a freeze frame mode under the control of the controller 22. In addition, the displays 34 and 40 are provided, as shown in FIG. 2, with the video input to the circuitry 136 so that there is available to the editor/operator, if desired, all of the video "raw" information which is being used to generate the main display.

As noted above, in the preferred embodiment of the invention, a continuous loop of the same segment is not the most desirable presentation. Consequently, the controller 22 operates to modify the continuous loop approach and inserts between segments of the continuous loop segment presentation, an interruption display, for example the logo of the manufacturer of the equipment or some other scene which will clearly apprise the editor/operator, that the segment has terminated and is about to begin again. The length of the interruption can be varied and a time duration of approximately 2-3 seconds is preferred. This "psychological break" is important to efficient and satisfactory use of the equipment.

The operation of the equipment is similar when a transition situation occurs. In this transition mode of operation (the level of operation is the same as in the composition mode), the first and second video tape recorders mentioned above will display different segments. At the transition time, switching circuitry 136 switches from the first recorder to the second recorder as described in the continuous loop segment presentation, however the second recorder instead of repeating the display of the first recorder will provide the segment into which the first recorded segment will "dovetail". As noted above, if desired, various transition effects can be implemented at this juncture.

During the transition mode of operation, displays 34 and 38 display the segment outputs of the first and second video tape recorders so that those recorder outputs are available prior to and after transition. Furthermore, in the illustrated embodiment of the invention, controller 22 operates the switching circuitry 134 so that displays 36 and 38 show the freeze frame pictorial labels representing the transition currently being viewed.

Controller 22 can provide various transitions between two segments. The transition between two segments in accordance with fade-in fade-out, dissolve, etc. procedures, such as those standardly used on commercial television, can be implemented using commercially available equipment. Such equipment, under the control of controller 22, is employed in conjunction for example with switching circuitry 136. In this manner, special effects can be inserted by the operator through the console 12.

Referring to FIG. 1, a pair of audio controlling foot pedals 304,306 control a video independent audio source during the composition process. Normally, the audio which accompanies the recorded video material is copied and composed at the same time that the video material is copied and composed. If, however, it is desired to either overlay, substitute, or insert new audio into the composition product, this can be accomplished using the audio in an overlay relationship to a desired segment. This function is provided for by controller 22.

The audio foot pedals 304,306 enable a shift in the audio location relative to the video during the composition process. One of the foot pedals provides forward and backward slip of the video independent audio while the other pedal controls the rate of shift. Thereby the video independent audio is synchronized with the video.

The video composing method and apparatus described herein provides the user with great flexibility and ease of manipulation of the video source material. The assembled material can be collected from many sources in whatever order is necessary to compose the finished program. Furthermore, after assembling his story, the user can go back and modify the shots and scenes as required. He can resequence scenes and shots, adjust their length, or the transitions, just as he had done during the previous composing pass. This re-composition process can continue with as many iterations as required without any loss of flexibility until the assembled material is satisfactory.

Since the composition process always uses multiple, unmodified copies of the source material as its base, rather than second or third generation partially composed material, the composer can always reinsert shots or scenes previously deleted or add completely new shots from the original source material or, from direct video input ports by receiving signals from external devices such as video cameras or remote feeds. The editor can even compose multiple versions of the same story using a single set of source materials and decide at a later time which one to use for final release.

When the composition is complete, the apparatus and method will produce a complete program package for news and/or an edit confirmation list in machine readable form (for programs) that can be used by conventional computer controlled on-line editing systems. This can be done with remote autoconfirmation with little or no operator intervention. In the illustrated embodiment, the system will also drive $\frac{3}{4}$, 1, and 2 inch tape transports directly as external interfaces, through interface 124, under the control of controller 22, to provide full on-line editing capability.

Additions, subtractions, deletions, and other modifications of the invention will be obvious to those practiced in the art and are within the scope of this invention.

What is claimed is:

1. Composing apparatus for selecting segments from image source material stored in at least one storage medium and for denoting serially connected sequences of said segments, said apparatus comprising
   a pictorial display means,
   an operator control means, and
   a composing control means responsive to said operator control means for controlling said storage media and said pictorial display means, said composing control means comprising
   means for denoting a start and an end of each of a plurality of segments of said source material,
   means for identifying each said segment by a pictorial image segment label,
   means for selectively displaying segments of said image source material on said pictorial display means,
   means for assembling at least a plurality of said labels into a serially connected label sequence,
   operator responsive means for locating any said segment by displaying said pictorial labels in said label sequence, and
   said displaying means being further adapted for displaying the segment identified by a selected label.

2. The composing apparatus of claim 1 wherein said composing control means further comprises
   means for grouping serially connected ones of said connected segments into segment groups, said segments in said segment groups having the same connected serial relationship as in said connected image sequence,
   in which
      said identifying means are further selectively operable for identifying each segment group by a pictorial group label,
      said operator responsive locating means are further selectively operable for locating any said segment group by displaying said pictorial group labels in a group label sequence corresponding to said segment group sequence relationship, and
   means responsive to said operator control means for selectively operating upon said segments and said segment groups using said labels and label groups.

3. The composing apparatus of claim 1
   further wherein said pictorial display means comprises a plurality of pictorial display screens arranged in an ordered array, and
   wherein said operator responsive locating means further comprises
   means for providing said display screens with electrical signals pictorially representing a selected limited number of said sequence of said labels; and
   operator responsive means for changing the displayed labels.

4. The composing apparatus of claim 3 further wherein said pictorial display means comprises
   a plurality of display processors, each processor being responsive to said composing control means for receiving electrical signals representing an image to be displayed and for repeatedly providing said received image to be displayed on pictorial display screens associated therewith.

5. The composing apparatus of claim 3 further wherein
   said operator responsive changing means selectively sequences said labels on said plural display screens according to said label sequence for searching for a labeled segment of said image source.

6. The composing apparatus of claim 1 wherein said identifying means includes means for labeling each segment by two pictorial images, a first label image corresponding to a beginning frame of said segment and a second label image corresponding to an ending frame of said segment.

7. The composing apparatus of claim 1 wherein said apparatus comprises at least a first and a second serial storage medium, each storing a representation of said segment to be displayed, and wherein said selectively displaying means comprises means for selectively controlling image information retrieval from said first and second storage media for repetitively cycling said first and second storage media for alternate image information retrieval whereby a continuous loop presentation of said segment can be displayed.

8. The composing apparatus of claim 7 wherein said composing control means further comprises means for inserting an interruption display image on said display means between repetitions of said repeating segment.

9. The composing apparatus of claim 1 wherein said apparatus comprises a first serial storage memory for storing a representation of a first segment to be displayed, a second serial storage memory for storing a representation of a second segment to be displayed, and wherein said composing control means further comprises means for selectively controlling image information retrieval from said first and second serial memories for repetitively and alternately displaying said first and second segments whereby a continuous loop alternating presentation of said first and second segments is displayed.

10. The composing apparatus of claim 9 wherein said composing control means further comprises operator responsive means for varying a transition between said first and second segments.

11. The composing apparatus of claim 10 wherein said composing control means further comprises means for generating a transition display segment for insertion between said first and second segments, and means for inserting said transition segment into the serially connected image sequence between said first and second segments.

12. The composing apparatus of claim 9 wherein said denoting means further comprises means for dynamically changing the start and end of each of said first and second segments.

13. The composing apparatus of claim 1 further comprising a plurality of video tape recorders each having a video output, a plurality of video tape recorder interfaces, each said interface being associated with one of said recorders, each said interface being further connected to said composing control means, whereby said composing control means operates and controls each said video tape recorder through its associated interface.

14. The composing apparatus of claim 13 wherein said display means further comprises a plurality of display screens, and an output video switch means responsive to said composing control means for connecting the video outputs of selected ones of said recorders to selected ones of said display screens.

15. The composing apparatus of claim 14 further comprising a video digitizing means having an analog-to-digital converter and a read/write digital storage memory, means for connecting said digitizing means to said output video switch means and to said composing control means, and further wherein said pictorial display means comprises a plurality of display processors, each processor being responsive to said composing control means for receiving electrical signals representing an image to be displayed and for repeatedly providing said received image to be displayed on pictorial display screens associated therewith, and means responsive to said composing control means for converting a video input from said switch means into digital data and for storing said data in a digital memory, and means responsive to said composing means for making said data in said digital memory available to said display processors.

16. The composing apparatus of claim 14 further comprising a plurality of video input lines, an input video switch means responsive to said composing control means for connecting selected ones of said video input lines to selected ones of said video tape recorders.

17. The composing apparatus of claim 16 further comprising a video clock generation means for generating clock signals including field address signals, and said composing control means further comprising means for selectively adding said address signals to video image data generated within said apparatus.

18. The composing apparatus of claim 13 further comprising a video clock generation means for generating clock signals including field address signals, and said composing control means further comprising means for selectively adding said address signals to video image data generated within said apparatus, and means for connecting said clock signals to each said recorder interface.

19. Apparatus for composing image source material stored on at least one image storage medium, said source material being composed of a sequence of serially stored fields representing a time sequential visual image, sequences of said fields being associated to form visual segments, said apparatus comprising a pictorial display means for providing a pictorial representation of a selected current segment of interest, an operator control means, a composing control means operative with said medium and said operator control means and comprising means responsive to said operator control means for repetitively selecting successive current segments, means for repetitively making available to said display means electrical signals pictorially representing a then selected current segment, means for selecting from the then current segment, at least one labeling field for identifying said segment, operator responsive means for defining said current segment to form a current defined segment by denoting a new beginning and ending of said segment, means for maintaining a record of said sequences of defined segments in accordance with the label selecting and defining means, and means responsive to said operator control means for selectively providing electrical signals to said display means for pictorially representing at least a labeling field.

20. Apparatus for composing image source material stored on at least one image storage medium, said source material being composed of a sequence of stored fields representing a time sequential visual image, sequences of said fields being associated to form a visual segment, said apparatus comprising an active pictorial display means for providing a temporal pictorial presentation of a selected segment, designated the current segment, a plurality of passive pictorial display means, each for providing a visual presentation of a selected field of a sequence of fields forming a said visual segment, each said selected field thereby labeling one said visual segment, a plurality of storage memories, operator control means, and a composing control means operative with said medium and said operator control means, said composing control means comprising means responsive to said operator control means for repeatedly selecting among said sequences of fields for editing said sequences, a last selected sequence being the segment designated the current segment, means for repetitively providing said active display with electrical signals from said at least one storage medium pictorially representing said current segment in a repeating display, means for selectively supplying each said passive display means with electrical data signals representing a selected one of a sequence of said labeling fields, means for associating with each said current segment at least one current label field, and means for maintaining a record of the sequence of current segments.

21. The composing apparatus according to claim 20 wherein said control means further comprises means for manipulating said label fields representing said segments for forming a composed medium representation.

22. The composing apparatus according to claim 20 further comprising a system clock, a plurality of video tape recording means, each having a video output line and a video input line, a plurality of recording means interface units connected to said composing control means and each unit having means for operating an associated recorder in a forward mode and in a reverse mode, means for controlling the timing of forward and reverse operation of each said recording means, and said repetitively providing means further comprising means for selectively and repetitively switching between said video output of at least two of said recording means for repetitively providing said current segment in a continuous loop format to said active display means.

23. The composing apparatus of claim 22 wherein said repetitively providing means further comprises an operator responsive means for varying the segment playback rate of the current segment being displayed by said active pictorial display, and an operator responsive designation control for designating from a current segment a beginning field label and an ending field label.

24. The composing apparatus of claim 20 wherein said display means further comprises an ordered plurality of pictorial display means pairs, each pair having a first display screen for providing a visual presentation of a beginning label and a second display screen for providing a visual presentation of an ending label, each said pair of beginning and ending labels being associated with a segment of the sequence of current segments, and said repetitively providing means further comprising means for selecting a segment corresponding to a selected label for display by said active display means.

25. The composing apparatus of claim 20 further comprising an operator console, said active display means being adapted to provide at least one display screen on said console, each said passive display means being adapted to provide a plurality of display screens on said console, said screens being positioned in an ordered spatial array, said selectively supplying means being further adapted to provide said passive display means with electrical signals representing a sequence of said pictorial labels, and said passive display means further comprising a display interface for receiving instructions from said composing control means and video data representing pictorial labels and for effecting an ordered pictorial presentation of said labels on said screens, whereby the spatial display on said screens provides in effect a temporal snapshot representation of a sequence of said segments.

26. The composing apparatus of claim 25 further comprising means for mounting said screens in a two row ordered array, each column of screens being adapted to display a label pair associated with a defined segment, and said composing control means further comprising means for dynamically searching through said labels by shifting said labels in the direction of an array row, whereby a search through said sequence of segments can be effected.

27. The composing apparatus of claim 25 further wherein said composing control means comprises means for adding text material to said pictorial label representing electrical signals, and switch means for selectively displaying said text material on said passive display screens.

28. The composing apparatus of claim 20 further comprising a system clock means, means for writing a clocked identification tag to be associated with each said field, each identification tag for a field associated with one storage medium being uniquely identifiable from the identification tag associated with any other field associated with said one storage medium, a controlling interface associated with each said storage medium, said controller including means for receiving instructions from said composing control means and clock signals from said clock means, said instructions including at least a playback start time relative to said system clock means, a starting field identification, and a display time duration, and said interface means being further adapted for retrieving data from said storage medium in accordance with said instructions.

29. The composing apparatus of claim 28 wherein each said storage medium is a video tape recorder, and further comprising means for recording on said recorder a video input signal, and means for recording with said signal said clocked identification tags.

30. The composing apparatus of claim 20 wherein said composing control means further comprises a central digital processor, a digital bus connected to said processor, and said passive display means further comprising a plurality of display maintaining interface means being connected to passive display screens, and each display maintaining means comprising a display storage element for storing a digital representation of a label to be displayed, bus means for communicating with said digital bus, and display screen interface means for providing analog signals to said display screens for providing said visual presentation.

31. The composing apparatus of claim 30 further comprising a plurality of media playback devices, each having a video output line, device interface means for controlling the data retrieving playback operation of said playback devices in response to said composing control means, switch means for selectively switching, under control of the composing control means, between said playback device video output lines for connecting a selected one video output line as the switch means output line, and an analog-to-digital converter connected to the switch means output line, and connected to the digital bus for providing a digital output video signal thereto.

32. The composing apparatus of claim 20 wherein said composing control means further comprises means for automatically dividing said source material into segments according to a predetermined selection method, and operator controlled means for changing said beginning and ending fields of said segments whereby the segment presentations displayed by said active display are dynamically updated to visually represent said new beginning and ending field.

33. The composing apparatus of claim 20 further comprising a printer connected to said composing control means, an alphanumeric input keyboard for inputting textual material associated with a labeled scene, to said composing control means, and said composing control means further comprising means for printing a storyboard, said storyboard representing thereon a series of scenes, each represented by at least one pictorial label and the previously input textual material associated therewith.

34. The composing apparatus of claim 20 wherein said composing control means further comprises means for simultaneously controlling the playback operation of a plurality of video tape recorders for selectively providing the video signal data to the passive and active display means in response to instructions from an operator control panel.

35. The composing apparatus of claim 20 further comprising means for supplying a video independent audio signal, and means for synchronizing said audio signal with a current video segment, said synchronizing means comprising means for time shifting said audio signal relative to said video segment, and means for varying the rate of said time shifting.

36. A composing method for selecting segments from image source material stored in at least one storage medium and for denoting serially connected sequences of said segments, said method comprising the steps of:

denoting a start and an end of each of a plurality of segments of said source material, identifying each said segment by a pictorial image segment label, selectively displaying segments of said image source material on a pictorial display means, assembling at least a plurality of said segment labels into a serially connected label sequence, locating any segment by displaying said pictorial labels in said label sequence, and displaying the segment identified by a selected label.

37. The composing method of claim 36 wherein said composing control means further comprises the steps of grouping serially connected ones of said connected segments into segment groups, said segments in said segment groups having the same connected serial relationship as in said connected image sequence, identifying each segment group by a pictorial group label, locating any said segment group by displaying said pictorial group labels in a group label sequence corresponding to said segment group sequence relationship, and selectively operating upon said segments and said segment groups using said labels and label groups.

38. The composing method of claim 36 further comprising the steps of providing a plurality of pictorial display screens arranged in an ordered array, providing said display screens with electrical signals pictorially representing a selected limited number of said sequence of said labels, and changing the displayed labels.

39. The composing method of claim 38 further comprising the step of receiving electrical signals representing an image to be displayed, and repeatedly displaying said received image on a pictorial display screen associated with a display processor.

40. The composing method of claim 38 further comprising the step of selectively sequencing said labels on plural display screens according to said label sequence for searching for a labeled segment of said image source.

41. The composing method of claim 36 further comprising the step of labeling each defined segment by two pictorial images, a first label image corresponding to a beginning frame of said segment and a second label image corresponding to an ending frame of said segment.

42. The composing method of claim 36 comprising the steps of storing a representation of said segment to be displayed in at least a first and a second serial storage medium, selectively controlling image information retrieval from said first and second storage media, repetitively cycling said first and second storage media for alternate image information retrieval, and thereby displaying a continuous loop presentation of said segment.

43. The composing method of claim 42 further comprising the step of inserting an interruption display image between repetitions of said repeating segment.

44. The composing method of claim 42 further comprising the step of dynamically changing the start and end of said segment.

45. The composing method of claim 44 further comprising the steps of switchably connecting video outputs of selected ones of a plurality of video tape recorders to selected ones of a plurality of display screens, digitizing a switched recorder video output, directing said digitized video output to a display processor, and displaying said received digitized video image on a said pictorial display screen associated therewith.

46. The composing method of claim 45 further comprising the steps of connecting selected ones of a plurality of video input lines to selected ones of said video tape recorders, generating clock signals including field address signals, and selectively adding said address signals to video image data generated within said apparatus.

47. The composing method of claim 44 further comprising the steps of generating clock signals including field address signals, selectively adding said address signals to video image data generated within said apparatus, and connecting said clock signals to each of a plurality of said recorder interfaces.

48. The composing method of claim 36 further comprising the steps of storing a representation of a first segment to be displayed in a first serial storage memory, storing a representation of a second segment to be displayed in a second serial storage memory, selectively controlling image information retrieval from said first and second serial memories, and repetitively and alternately displaying said first and second segments in a continuous loop alternating presentation.

49. The composing method of claim 48 further comprising the step of varying a transition between said first and second segments.

50. The composing method of claim 49 further comprising the steps of generating a transition display between said first and second segments, and inserting said transition into the serially connected image sequence between said first and second segments.

51. A method for composing image source material stored on at least one image storage medium, said source material being composed of a sequence of serially stored fields representing a time sequential visual image, sequences of said fields being associated to form visual segments, said method comprising the steps of providing a pictorial representation of selected current segment of interest, providing an operator control means, repetitively selecting successive current segments, repetitively making available for display electrical signals pictorially representing a then selected current segment, selecting from the then current segment at least one labeling field for identifying said segment, delimiting said current segment to form a current defined segment by denoting the beginning and ending of said segment, maintaining a record of said sequences of defined segments in accordance with the label selecting and delimiting steps, and selectively providing electrical signals for pictorially representing and displaying at least a labeling field.

52. A method for composing image source material stored on at least one image storage medium, said source material being composed of a sequence of serially stored fields representing a time sequential visual image, sequences of said fields being associated to form a visual segment, said method comprising the steps of providing a temporal pictorial presentation of a selected segment, designated the current segment, on an active pictorial display, providing on each of a plurality of passive pictorial displays a visual presentation of a selected field of a sequence of fields forming a said visual segment, each said selected field thereby labeling one said visual segment, repeatedly selecting among said sequences of selected label fields for composing said segment sequences, a segment associated with a last selected label field being the segment designated the current segment, repetitively providing said active display with electrical signals from memories for pictorially representing said current segment in a repeating display, selectively supplying each said passive display with electrical data signals representing a selected one of a sequence of said labeling fields, associating with each current segment at least one current label field, and maintaining a record of the sequence of current segments.

53. The composing method according to claim 52 further comprising the step of manipulating said label fields representing said segments for forming a composed medium representation.

54. The composing method according to claim 52 further comprising the step of selectively and repetitively switching between said video output of at least two recording means for repetitively providing said current segment in a continuous loop format to said active display means.

55. The composing method of claim 54 further comprising the steps of varying the segment playback rate of the current segment being displayed by said active pictorial display, and designating for a current segment a beginning field label and an ending field label.

56. The composing method of claim 52 further comprising the steps of ordering in a regular spatial array a plurality of pictorial display pairs, each pair having a first display screen for providing a visual presentation of a beginning label and a second display screen for providing a visual presentation of an ending label, each said pair of beginning and ending labels being associated with a segment of the sequence of current segments, and selecting a segment corresponding to a selected label for display by said active display.

57. The composing method of claim 52 further comprising the step of receiving instructions and video data representing pictorial labels on a display interface for effecting an ordered pictorial presentation of said labels on display screens, whereby the spatial display on said screens provides in effect a temporal snapshot representation of a sequence of said segments.

58. The composing method of claim 57 further comprising the steps of mounting said display screens in a two row ordered array on a console, each column of screens being adapted to display a label pair associated with a visual segment, and dynamically searching through said labels by shifting said labels in the direction of an array row, whereby a search through said sequence of segments can be effected.

59. The composing method of claim 52 further comprising the steps of writing a clocked identification tag to be associated with each said field, each identification tag for a field associated with one storage medium being uniquely identifiable from the identification tag associated with any other field associated with said one storage medium, receiving instructions including at least a playback start time relative to a system clock, a starting field identification, and an ending field identification, and retrieving data from said storage medium in accordance with said instructions.

60. The composing method of claim 59 wherein each said storage medium is a video tape recorder, and comprising the steps of recording on said recorder a video input signal, and recording with said video signal said clocked identification tags.

61. The composing method of claim 52 further comprising the steps of storing a digital representation of a label to be displayed, communicating said digital representation along a digital bus, and providing said digital representation from said bus to a display screen for providing a visual presentation.

62. The composing method of claim 60 further comprising the steps of controlling the data retrieving playback operation of a plurality of playback devices, selectively switching between playback device video output lines for connecting a selected one video output line as a switch means output line, and providing a digital output video signal for said selected video output.

63. The composing method of claim 52 further comprising the steps of automatically dividing said source material into segments according to a predetermined selection method and changing said beginning and ending fields of said segments whereby the segment presentation displayed by said active display is dynamically updated to visually represent said new beginning and ending fields.

64. The composing method of claim 52 further comprising the steps of inputting textual material associated with a labeled scene, printing a storyboard, said storyboard representing thereon a series of scenes, each represented by at least one pictorial label and the previously input textual material associated therewith.

65. The composing method of claim 52 further comprising the step of simultaneously controlling the playback operation of a plurality of video tape recorders for selectively providing the video signal data to the passive and active displays in response to instructions from an operator control panel.

66. The composing method of claim 52 further comprising the step of shifting, in time, an audio signal independently of a video signal for synchronizing said audio and video signals.

67. The composing method of claim 52 further comprising the step of selectively switching said passive pictorial display for presenting text material for display with said visual presentation by shifting the pictorial display in a vertical direction.

* * * * *